US008638758B2

(12) United States Patent
Black

(10) Patent No.: US 8,638,758 B2
(45) Date of Patent: Jan. 28, 2014

(54) METHODS AND SYSTEMS FOR VARIABLE RATE BROADCAST WITH SOFT HANDOFF

(75) Inventor: Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 13/334,882

(22) Filed: Dec. 22, 2011

(65) Prior Publication Data

US 2012/0149379 A1  Jun. 14, 2012

Related U.S. Application Data

(63) Continuation of application No. 11/182,232, filed on Jul. 15, 2005, now Pat. No. 8,111,663.

(60) Provisional application No. 60/589,819, filed on Jul. 20, 2004.

(51) Int. Cl.
*H04W 4/00* (2009.01)
*H04B 7/216* (2006.01)
*H04W 36/00* (2009.01)

(52) U.S. Cl.
USPC ............ 370/331; 370/335; 370/342; 455/436

(58) Field of Classification Search
USPC ................. 370/331–338, 342–343, 347–350; 455/436–444
See application file for complete search history.

(56) References Cited

U.S. PATENT DOCUMENTS

| 6,122,310 | A | 9/2000 | Ziemer et al. | |
| 6,314,038 | B1 | 11/2001 | Kim et al. | |
| 6,359,877 | B1 * | 3/2002 | Rathonyi et al. | 370/349 |
| 6,360,098 | B1 * | 3/2002 | Ganesh et al. | 455/436 |
| 6,393,012 | B1 | 5/2002 | Pankaj | |
| 6,438,518 | B1 | 8/2002 | Manjunath et al. | |

(Continued)

FOREIGN PATENT DOCUMENTS

| JP | 2001189952 | 7/2001 |
| RU | 2178240 | 1/2002 |

(Continued)

OTHER PUBLICATIONS

3GPP. ETSI TS 125 346 V6.1.0 (Jun. 2004): "Universal Mobile Telecommunications System (UMTS); Introduction of the Multimedia Broadcast/Multicast Service (MBMS) in the Radio Access Network (RAN); Stage 2 (3GPP TS 25.346 version 6.6.0 Release 6)," ETSI Standards, Sophia Antipolis Cedex, France, XP014031939.

(Continued)

*Primary Examiner* — Thai Hoang
(74) *Attorney, Agent, or Firm* — Kristine U. Ekwueme

(57) ABSTRACT

Embodiments described herein relate to providing variable rate broadcast services with soft handoff in wireless communications. In an embodiment, a plurality of access points (e.g., servicing various cells in a broadcast area) may transmit a broadcast content in accordance with a rate set. The rate set may include a plurality of distinct data rates each associated with a transmission format, configured to allow the broadcast packets transmitted by the access points to be incrementally combined (e.g., on a per-slot basis at a subscribing AT). The data rates and corresponding transmission formats in the rate set may be selected in relation to the supportable data rates of the cells in the broadcast area, as well as the requirements for supporting soft handoff in these cells.

36 Claims, 12 Drawing Sheets

(56) References Cited

U.S. PATENT DOCUMENTS

| | | | |
|---|---|---|---|
| 6,731,936 B2 | 5/2004 | Chen et al. | |
| 6,757,246 B2 | 6/2004 | Alasti et al. | |
| 7,027,515 B2 | 4/2006 | Lin | |
| 7,116,724 B2 | 10/2006 | You | |
| 7,124,429 B2 | 10/2006 | Nagai et al. | |
| 7,340,667 B2 | 3/2008 | Saado et al. | |
| 8,111,663 B2 | 2/2012 | Black | |
| 2003/0013451 A1* | 1/2003 | Walton | 455/447 |
| 2003/0036384 A1 | 2/2003 | Chen et al. | |
| 2003/0072312 A1 | 4/2003 | Alasti et al. | |
| 2004/0081125 A1 | 4/2004 | Ranta-Aho et al. | |
| 2004/0248603 A1 | 12/2004 | Canoy | |
| 2005/0096055 A1 | 5/2005 | Colban et al. | |
| 2005/0111397 A1* | 5/2005 | Attar et al. | 370/319 |
| 2005/0138671 A1* | 6/2005 | Love et al. | 725/123 |
| 2005/0271045 A1 | 12/2005 | Mo | |
| 2009/0103494 A1* | 4/2009 | Ma et al. | 370/331 |
| 2009/0213905 A1 | 8/2009 | Proctor, Jr. et al. | |

FOREIGN PATENT DOCUMENTS

| | | |
|---|---|---|
| RU | 2179373 | 2/2002 |
| TW | 486914 B | 5/2002 |
| TW | 525354 B | 3/2003 |
| TW | 200410575 | 6/2004 |
| WO | WO9938278 | 7/1999 |
| WO | WO9956405 | 11/1999 |
| WO | WO03041326 | 5/2003 |
| WO | WO03085875 | 10/2003 |
| WO | WO2004038951 | 5/2004 |
| WO | WO2004039011 | 5/2004 |

OTHER PUBLICATIONS

European Search Report—EP08010585, Search Authority—Munich—Jul. 30, 2008.

European Search Report—EP10179124, Search Authority—Munich Patent Office, Nov. 5, 2010.

International Preliminary Report on Patentability—PCT/US05/025523, IPEA—US, Aug. 18, 2007.

International Search Report—PCT/US2005/025523—International Search Authority, European Patent Office, Nov. 10, 2005.

Masala, E. et al.: "Rate-Distortion Optimized Slicing, Packetization and Coding for Error Resilient Video Transmission," Proceedings of the Data Compression Conference (DCC 2004), (Mar. 23-25, 2004), pp. 182-191.

Taiwan Search Report-TW094124520-TIPO-Sep. 14, 2011.

Written Opinion—PCT/US05/025523, International Searching Authority—European Patent Office, Nov. 10, 2005.

\* cited by examiner

METHODS AND SYSTEMS FOR VARIABLE RATE BROADCAST WITH SOFT HANDOFF

CLAIM OF PRIORITY UNDER 35 U.S.C. §119

The present application is a Continuation of U.S. patent application Ser. No. 11/182,232 filed on Jul. 15, 2005, entitled "Methods and Systems for Variable Rate Broadcast With Soft Handoff," now allowed, assigned to the assignee hereof and expressly incorporated by reference herein and claims priority to Provisional Application No. 60/589,819, entitled "VARIABLE RATE BROADCAST WITH SOFT HANDOFF," filed Jul. 20, 2004, assigned to the assignee hereof and hereby expressly incorporated by reference herein.

BACKGROUND

1. Field

This disclosure relates generally to wireless communications. More specifically, embodiments disclosed herein relate to providing variable rate broadcast with soft handoff in wireless communications.

2. Background

Wireless communication systems are widely deployed to provide various types of communications (such as voice and data) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TD-SCDMA, and other standards. Broadcast and multicast services have been proposed to effectively transmit large quantities of data from a single source point to a group of users in wireless communication systems. Contents suitable for such point-to-multipoint services include news, stock quotes, sports events, movies, audio and video clips, and other multimedia data. As the demand for transmission of multimedia data grows, there lies a challenge to enhance the spectral efficiency and maximize the data rates of broadcast/multicast services.

DETAILED DESCRIPTION

Figure 1:
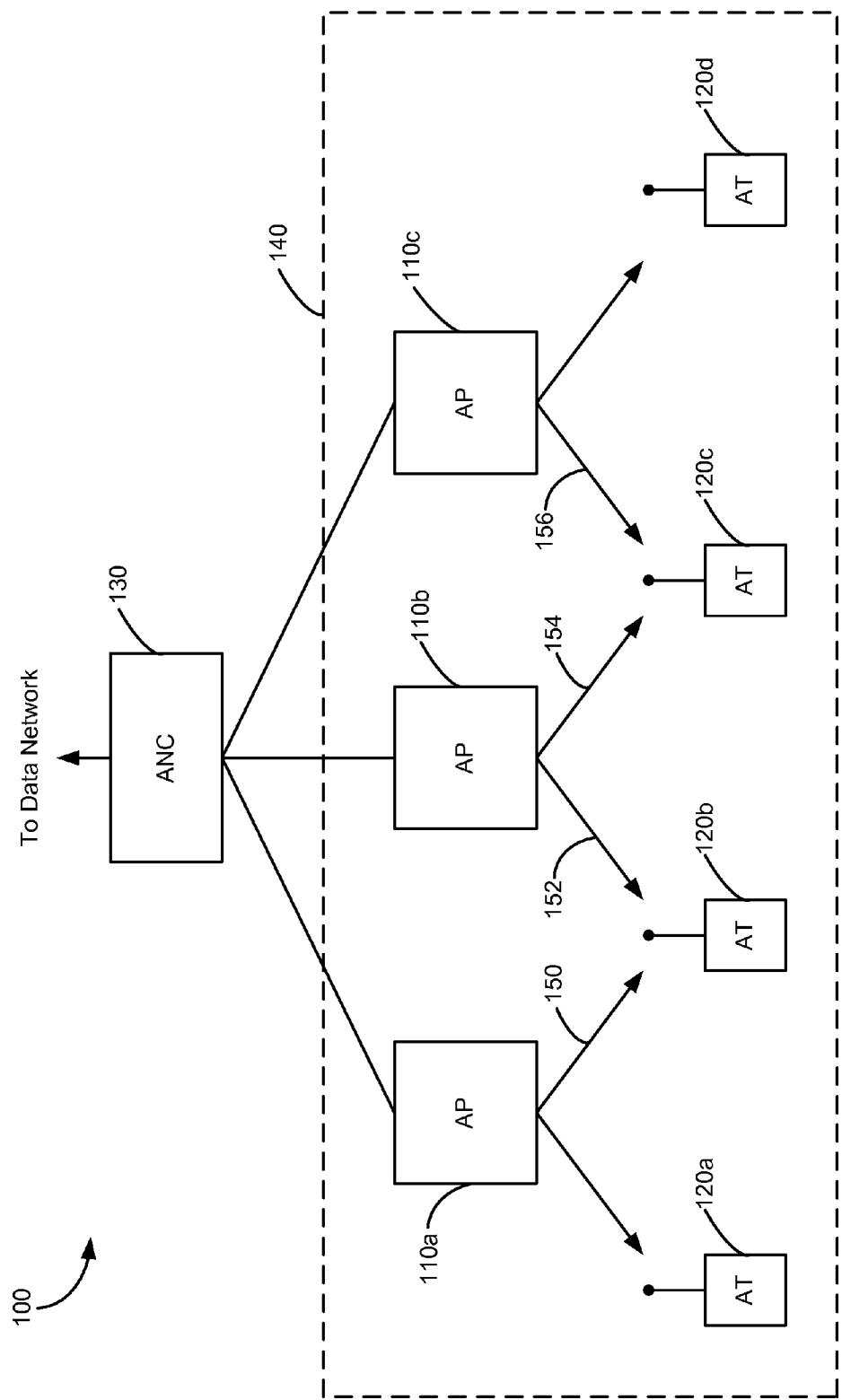
FIG. 1 illustrates an embodiment of a communication system.

Embodiments disclosed herein relate to methods and systems for providing variable rate broadcast services with soft handoff in communication systems.

A unicast communication described herein may generally refer to any one-to-one transmission of voice and/or data from a single source to a single receiver. In a wireless (e.g., cellular) communication system, a unicast communication may involve transmission from one or more transmitters (e.g., at an access network) to a single receiver (e.g., an access terminal). A broadcast/multicast communication (or service) described herein may generally refer to any point-to-multipoint transmission of data from a single source to a group of users in a broadcast area, which may include one or more sectors (or cells).

For a given broadcast service, an access network may receive a stream of information from a content server and transmit the information on a designated channel to a group of users in a broadcast area. The content of a broadcast communication (termed "broadcast content" herein) may be encapsulated in data packets (termed "broadcast packets" herein), as specified by appropriate protocols (such as Internet Protocol (IP)). A broadcast content may include (but not limited to) text, audio, pictures, video, data files, software upgrades, and other information.

A broadcast/multicast service may have a controlled access, e.g., only the users subscribing to the service receive the desired broadcast content on their access terminals. Unsubscribed users have no access to the broadcast/multicast service. Such controlled access may be achieved by encrypting the broadcast transmission/content in a manner that allows only the subscribers to decrypt the received broadcast content, for example.

An access network controller (ANC) may refer to the portion of a communication system configured to interface with a core network (e.g., a packet data network) and route data packets between access terminals (ATs) and the core network, perform various radio access and link maintenance functions (such as soft handoff), control radio transmitters and receivers, and so on. An ANC may include and/or implement the functions of a base station controller (BSC), such as found in a $2^{nd}$ or $3^{rd}$ generation wireless network. An ANC and one or more access points (APs) may constitute part of an access network (AN). An AP described herein may also be referred to as a base-station transceiver system (BTS), an access network transceiver (ANT), a modem pool transceiver (MPT), or a Node B (e.g., in a W-CDMA type system), etc. A cell may refer to a coverage area serviced by an AP. A cell may further include one or more sectors. A broadcast area may include one or more cells.

An AT described herein may refer to various types of devices, including (but not limited to) a wireless phone, a cellular phone, a laptop computer, a wireless communication personal computer (PC) card, a personal digital assistant (PDA), an external or internal modem, etc. An AT may be any data device that communicates through a wireless channel or through a wired channel (e.g., by way of fiber optic or coaxial cables). An AT may have various names, such as access unit, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more APs on a forward link and/or a reverse link at a given moment. The forward link (or downlink) refers to transmission from an AP to an AT. The reverse link (or uplink) refers to transmission from the AT to the AP.

In a wireless communication system implementing a broadcast/multicast service, soft handoff may be used to increase the broadcast transmission rate. In soft handoff, identical transmissions from one or more APs may be received and combined at an AT, hence allowing the AT to support a higher data rate. Because a broadcast content is intended to be received by multiple users dispersed in a broadcast area, broadcast transmissions are typically identical across various cells in the broadcast area. In some systems, broadcast transmissions may be of CDMA format, and each subscribing AT may soft-combine transmissions from APs servicing different cells, e.g., using a Rake receiver and/or an equalized receiver. In other systems, broadcast transmissions may be of orthogonal frequency division multiplex (OFDM) format, and each subscribing AT may soft-combine transmissions from APs servicing different cells, e.g., using a demodulation scheme based on Fast Fourier Transform (FFT).

In practice, however, cells in a broadcast area may have different supportable data rates. Consider, for example, a broadcast area including a dense urban network with a core of capacity-limited cells which are typically small in size, surrounded by a suburban network with larger coverage-limited cells. Because the supportable data rate typically varies with the ratio of the total received power (e.g., from all cells involved in soft handoff) to the total interference power, the maximum supportable broadcast rate for a small urban cell may be higher than that for a large suburban cell. To implement soft handoff in such a system, however, broadcast transmissions may have to be carried out at the lowest supportable rate amongst various cells in the broadcast area, hence unduly limiting the spectral efficiency of the system.

A need therefore exists for improving the spectral efficiency and maximizing the broadcast transmission rate of broadcast/multicast services.

To improve the overall spectral efficiency, it would be desirable to operate the broadcast transmissions at a variable rate in relation to the coverages of the cells. To maximize the broadcast transmission rate, it would be desirable to operate the broadcast transmissions in soft handoff. Embodiments disclosed herein relate to methods and systems for providing broadcast/multicast services at a variable rate while preserving soft handoff, thereby enhancing the overall spectral efficiency and maximizing the broadcast transmission rate.

In an embodiment, a plurality of APs (e.g., servicing various cells in a broadcast area) may transmit a broadcast content in accordance with a rate set. The rate set may include a plurality of distinct data rates each associated with a transmission format (e.g., specifying the number of transmission slots for transmitting a data packet), configured to allow the broadcast packets transmitted by the APs to be incrementally combined (e.g., on a per-slot basis at a subscribing AT). By way of example, consider a rate set including three data rates: $R_1=R$ (e.g., 1843.2 kbps), $R_2=R/2$ (e.g., 921.6 kbps), and $R_3=R/3$ (e.g., 614.4 kbps), e.g., associated with 1-slot, 2-slot, and 3-slot transmission format, respectively. The first slots of broadcast transmissions at the three rates are identical and may be soft-combined. The second slots of broadcast transmissions at rates $R_2$ and $R_3$ are identical and may also be soft-combined. Thus, to implement variable rate broadcast, the rate set may be so configured to allow for incremental combining, such as described above. The rate set may also be configured to support soft handoff in the broadcast area, as further described below.

Various aspects, features, and embodiments are described in further details below.

FIG. 1 illustrates a schematic diagram of a communication system 100, in which various disclosed embodiments may be implemented. By way of example, system 100 may include a plurality of APs 110, such as APs 110a-110c, each servicing a cell (not explicitly shown in FIG. 1). Various ATs 120, including ATs 120a-120d, are dispersed in various cells throughout the system. Each AT 120 may communicate with one or more APs 110, e.g., depending upon whether the AT is active and whether it is in soft handoff.

In system 100, an ANC 130 may be in communication with and serve to provide coordination and control for APs 110. For example, ANC 130 may be configured to control the routing of voice/data packets to ATs 120 via the corresponding APs 110. ANC 130 may be further in communication with a data network, e.g., via a packet data service node (PDSN) (both of which are not explicitly shown in FIG. 1). In some embodiments, system 100 may be configured to support one or more wireless communication standards, e.g., IS-95, cdma 2000, IS-856, W-CDMA, TD-SCDMA, other wireless communication standards, or a combination thereof.

System 100 may also be configured to implement a broadcast/multicast service, e.g., in a broadcast area 140. For example, ANC 130 may route a broadcast content (e.g., received from a data network which may also include a content server) to APs 110, which may in turn transmit the broadcast content to ATs 120 in broadcast area 140. In an embodiment, the broadcast/multicast service may be carried out at a variable rate with soft handoff. For example, ANC 130 may select a rate set including a plurality of distinct data rates each associated with a transmission format, configured to allow the broadcast transmissions to be incrementally combined (such as described above). The rate set may be selected in relation to the supportable data rates of the cells serviced by APs 110 in broadcast area 140, as well as the requirements for supporting soft handoff in such cells, as further described below. The rate set may also be selected based in part on the size of the broadcast content to be transmitted. AN 130 may then instruct APs 110 to transmit the broadcast content in accordance with the selected rate set. ATs 120 in broadcast area 140 may incrementally combine (e.g., on a per-slot basis) the broadcast packets received from various APs 110. For example, AT 120b may incrementally combine the broadcast packets from APs 110a, 110b, e.g., received via forward links 150, 152, respectively. AT 120c may incrementally combine the broadcast packets from APs 110b, 110c, e.g., received via forward links 154, 156, respectively.

As described above, to implement variable rate broadcast with soft handoff, the broadcast data rate and corresponding transmission format for a given cell need to be configured such to support soft handoff for the cell as well as the neighboring cells that rely on the cell for soft handoff, as the following examples illustrate. For illustration and clarity, the soft handoff coverage for a given cell (e.g., one or more neighboring cells that support the cell in soft handoff) extends to the adjacent cells in the examples below. Such should not be construed as limiting. The underlying principles and procedures thus described may be applied to other situations where the soft-handoff coverage extends beyond the adjacent cells.

FIGS. 2A-2D illustrate an embodiment of a broadcast area 200 in a communication system, including a plurality of cells. For illustration and clarity, cells in these figures are shown to be uniform in shape and size. Such should not be construed as limiting. In other embodiments, cells may have varying sizes and shapes (and may be omni-directional or sectorized). Also for clarity and simplicity, APs servicing and ATs dispersed in such cells are not explicitly shown in these figures.

Figure 2A:
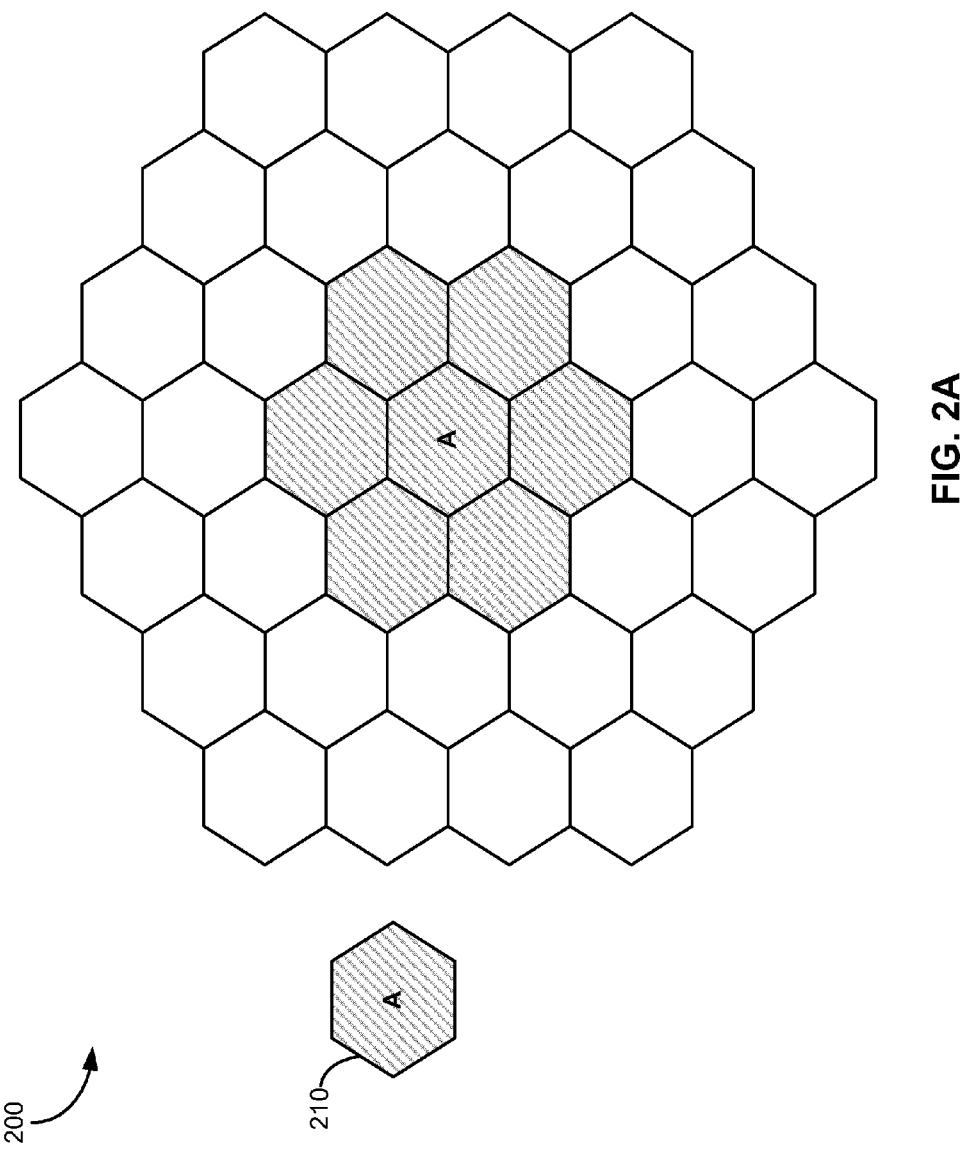
FIGS. 2A-2D illustrate an embodiment of implementing variable rate broadcast with soft handoff in a broadcast area of a communication system.

Consider A-cell(s) 210 illustrated in FIG. 2A. A-cell 210 may for example be part of a dense urban network, capable of supporting a higher data rate. Suppose that A-cell 210 is capable of supporting a data rate of R, corresponding to a transmission format of n slots (n being an integer, e.g., n=1). To support soft handoff in A-cell 210, the neighboring cells (such as those illustrated with similar patterns) also need to be able to support the 1-slot transmission format.

Figure 2B:
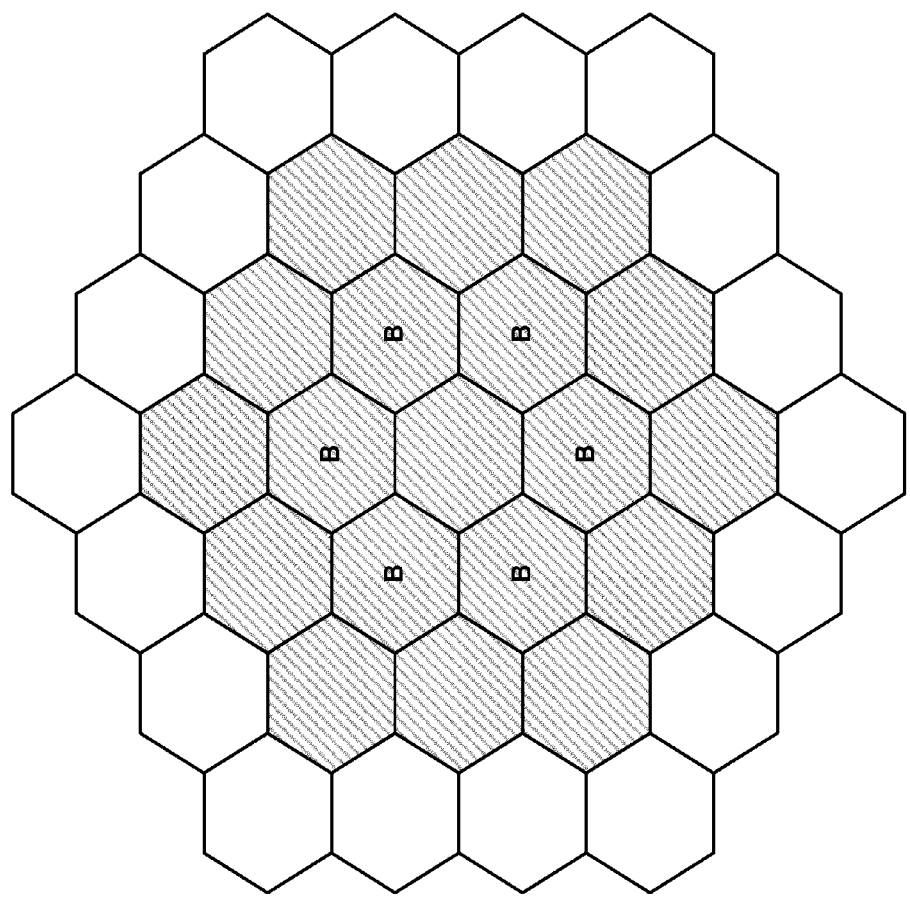
Figure 2B:
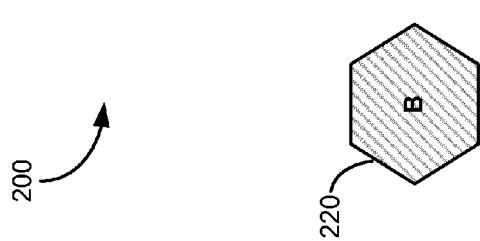

FIG. 2B illustrate a group of B-cells 220. Suppose that each B-cell 220 is also capable of supporting the data rate R, hence the 1-slot transmission format. To support soft handoff in each B-cell 220, the neighboring cells (such as those illustrated with similar patterns) also need to be able to support the 1-slot transmission format.

Figure 2C:
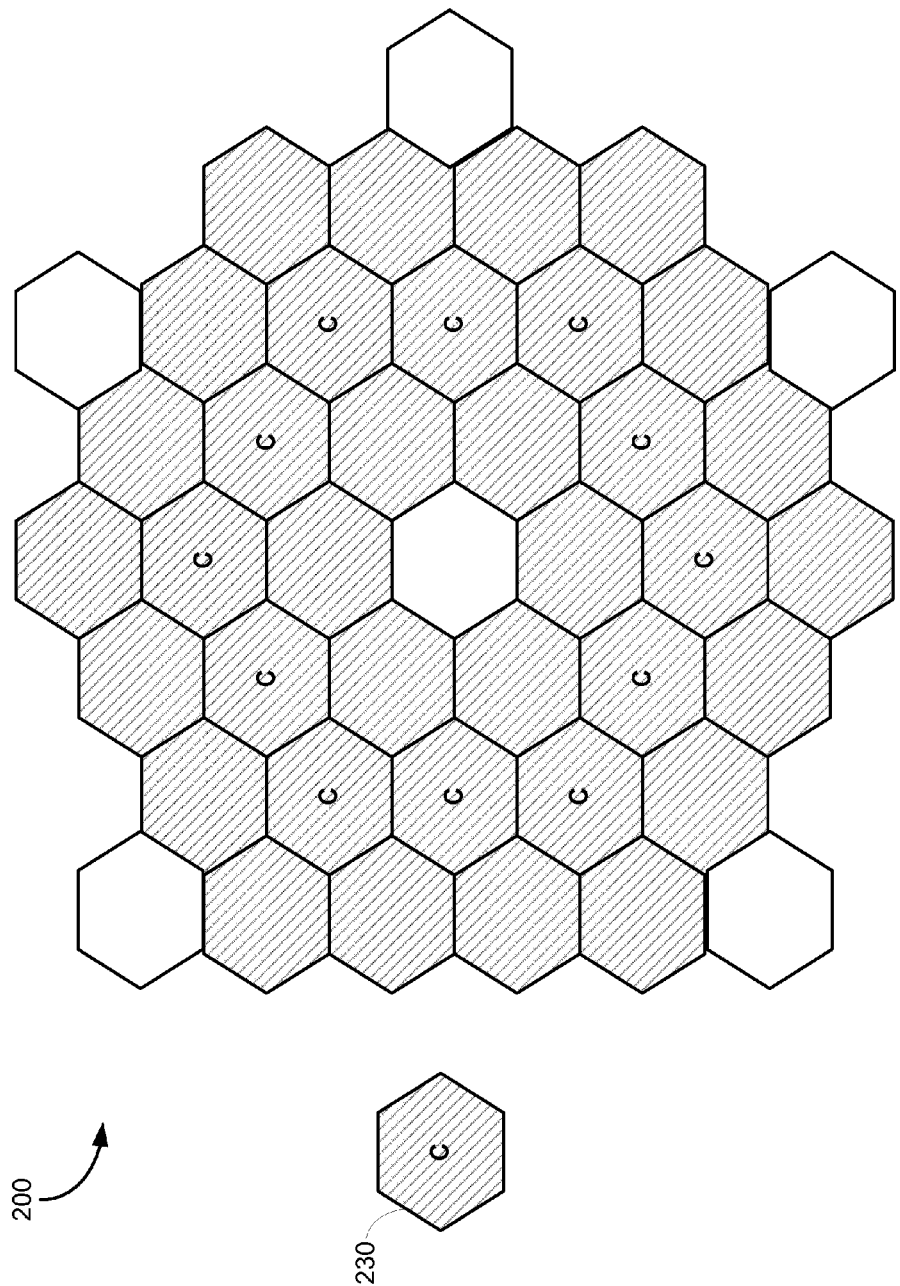

FIG. 2C illustrate a group of C-cells 230, which may for example be part of a large suburban network. Suppose that each C-cell 230 is able to support a data rate of (n/m)R (n and m being integers, e.g., n=1, m=3), corresponding to a transmission format of 3 slots. To support soft handoff in each C-cell 230, the neighboring cells (such as those illustrated with similar patterns) also need to be able to support the 3-slot transmission format.

Figure 2D:
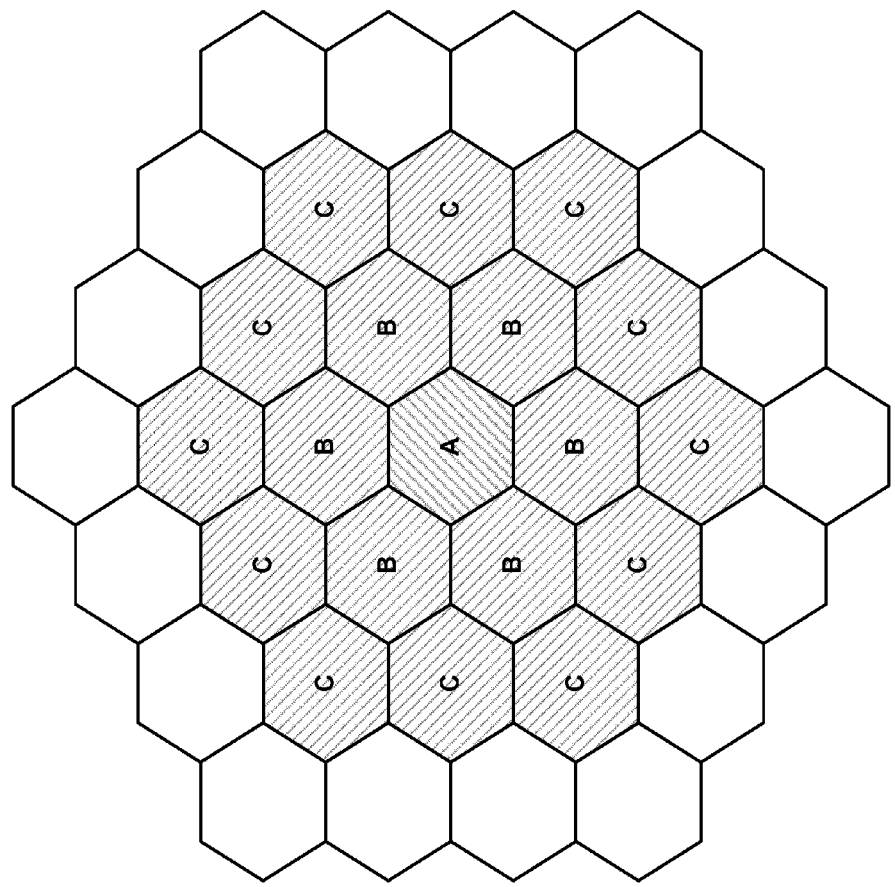
Figure 2D:
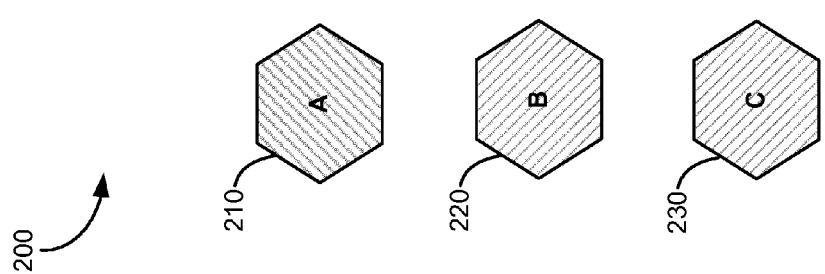

To satisfy the requirements for supporting soft handoff in all cells (e.g., A-cell 210, B-cells 220, and C-cells 230), such as described above, each B-cell 220 needs to be able to support the 1-slot transmission format as well as the 3-slot transmission format, so as to assist A-cell 210 and C-cells 230 in soft handoff. Because the data rates are such that the first slots of broadcast transmissions in both the 1-slot and 3-slot transmission formats are identical, each B-cell 220 may be assigned the 3-slot transmission format, as shown in FIG. 2D (where B-cells 220 are illustrated with patterns similar to those used for C-cells 230). In this way, the first slots of broadcast transmissions in A-cell 210 are identical and may be soft-combined. Because B-cells 220 are capable of supporting the 1-slot transmission format, ATs in B-cells may successfully decode the broadcast packets after the first slot; the remaining two slots of broadcast transmissions may serve to support soft handoff in C-cells 230, as further illustrated in FIG. 3 below.

Figure 3:
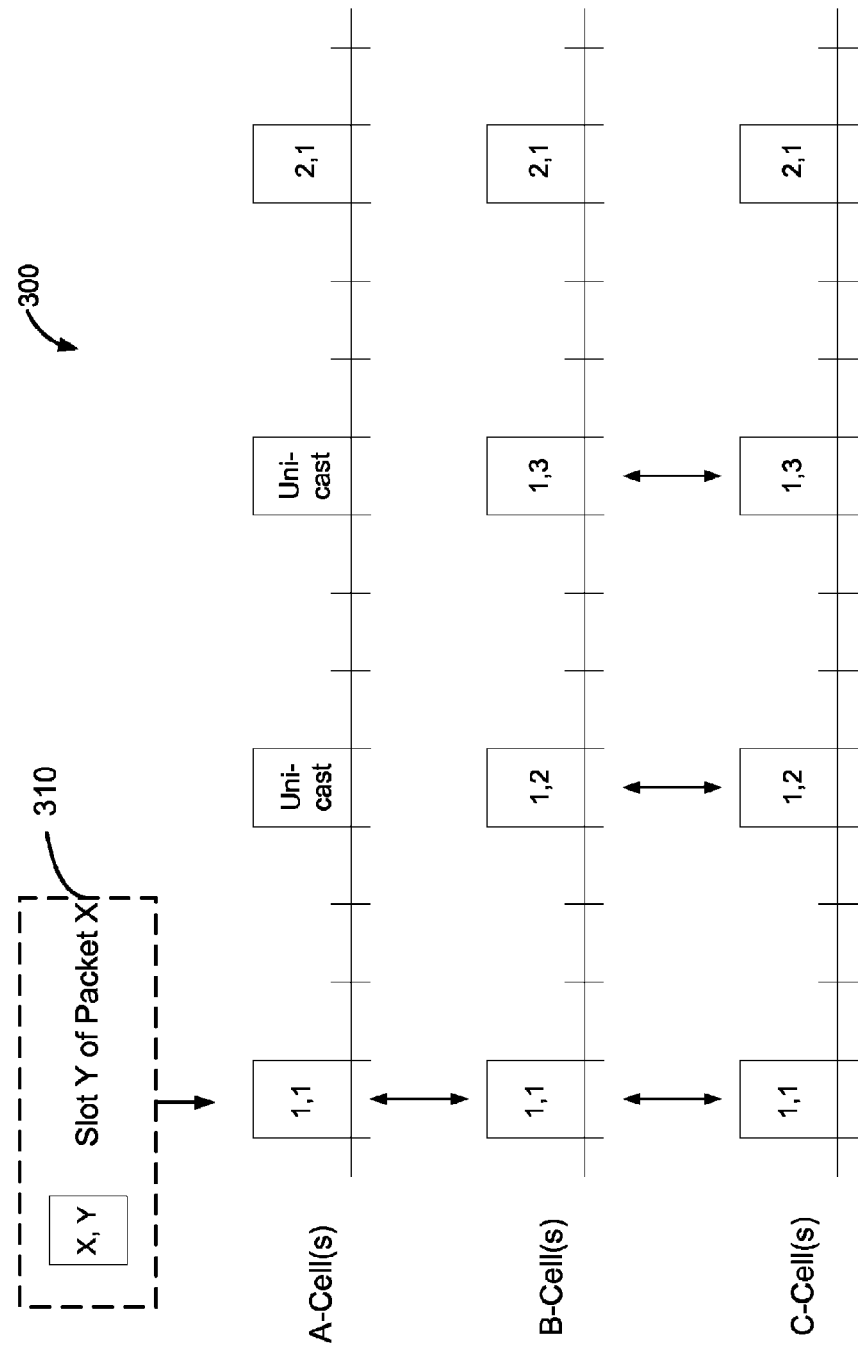
FIG. 3 illustrates an embodiment of timelines of broadcast transmissions in the embodiment of FIG. 2D.

FIG. 3 illustrates an embodiment of timelines of broadcast transmissions in the embodiment of FIG. 2D described above. Legend 310 serves to denote the pair of indices used to label each transmission slot. As illustrated in FIG. 3, for A-cell(s), transmission slots beyond the first slot may be used for unicast transmissions. Because B-cells are able to support the 1-slot transmission format, ATs in B-cells may successfully decode the broadcast packets after the first slot (as in A-cells); the remaining two slots serve to support the incremental combining (e.g., on a per-slot basis) in C-cells.

As illustrated in FIG. 2D and FIG. 3, B-cells may act as "buffer" cells to effectively isolate two coverage areas (e.g., A-cell(s) and C-cells) supporting different data rates, while preserving soft handoff. As illustrated above, such buffer cells may be capable of supporting the data rate of some neighboring cells (having a higher supportable data rate) but assigned the same transmission format as that for other neighboring cells (having a lower supportable data rate), hence allowing the neighboring cells to receive broadcast transmissions at different data rates while preserving soft handoff (e.g., by allowing for incremental combining such as described above). Such a variable rate approach enhances the overall spectral efficiency by minimizing the fraction of slots allocated to broadcast transmissions, while maximizing the broadcast data rate by preserving soft handoff. As shown in FIG. 3, without such an approach, broadcast transmissions to A-cells would have to be in the 3-slot transmission format and as a result, the transmission slots allocated for unicast transmissions would have to be used for broadcast transmissions as well, hence limiting the overall spectral efficiency.

Figure 4:
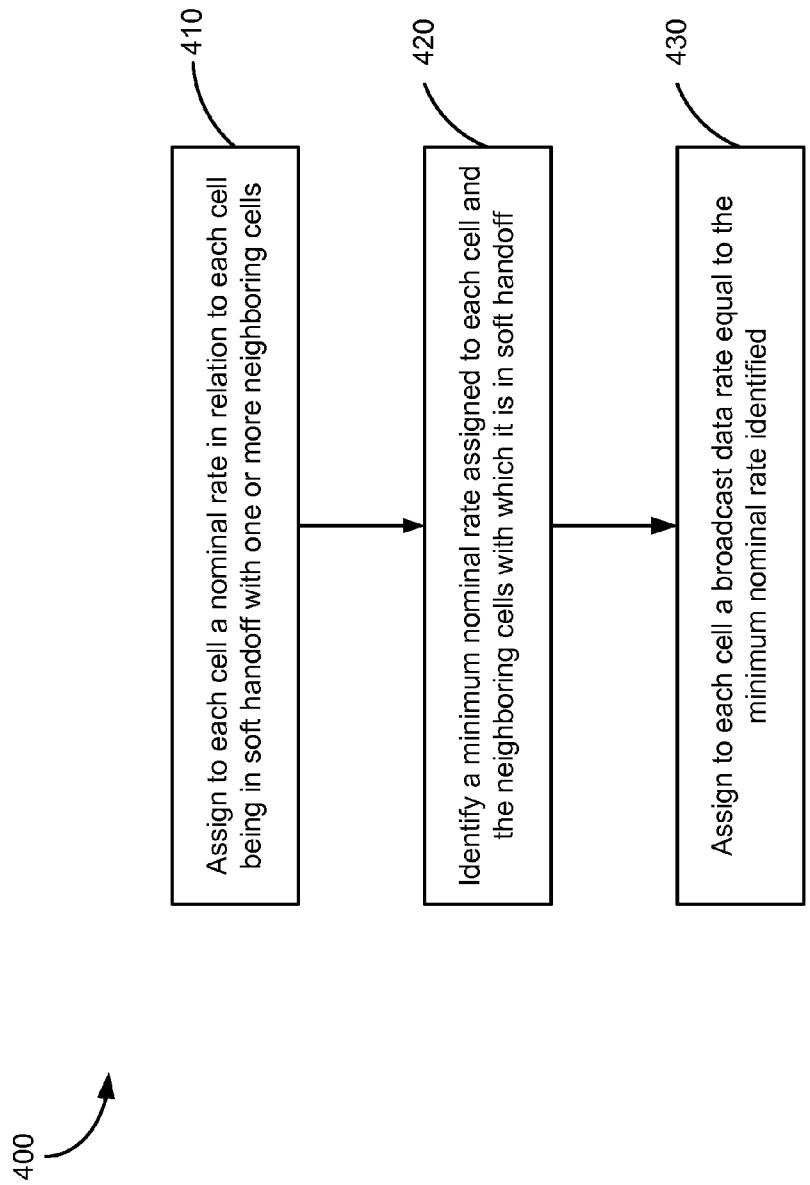
FIG. 4 illustrates a flow diagram of a process, which may be used in an embodiment to implement variable rate broadcast with soft handoff.

FIG. 4 illustrates a flow diagram of a process 400, which may be used in an embodiment to implement variable rate broadcast with soft handoff. Step 410 assigns a nominal rate to each cell in relation to the cell being in soft handoff with one or more neighboring cells (e.g., in a given soft handoff coverage). The nominal rate may for example take into account the soft handoff support the neighboring cells would provide. In some embodiments, the nominal data rates assigned to various cells in a broadcast area may be configured to allow for incremental combining, such as described above. Step 420 identifies a minimum (or lowest) nominal rate assigned to each cell and the neighboring cells with which it is in soft handoff (e.g., the same neighboring cells considered in step 410). Step 430 assigns to each cell a broadcast data rate equal to the minimum nominal rate thus identified.

Figure 5:
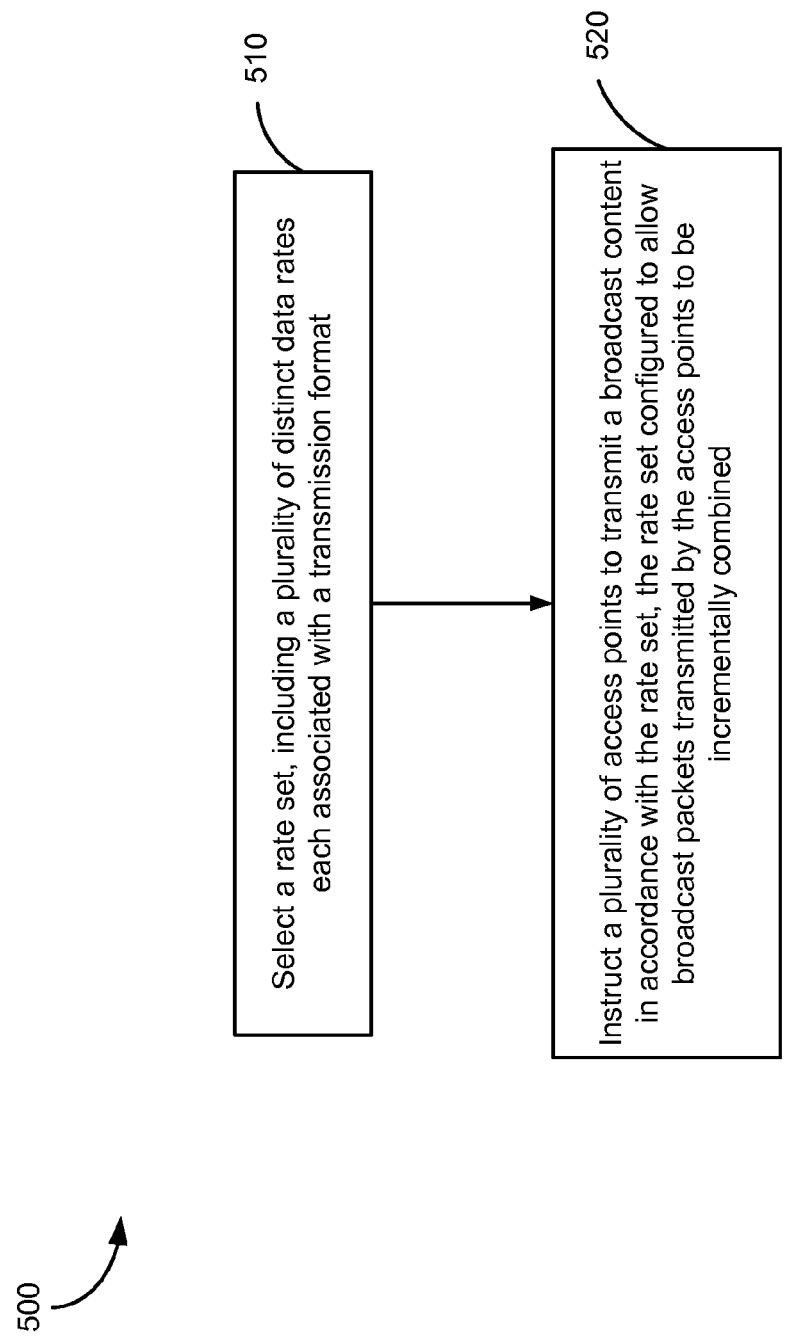
FIG. 5 illustrates a flow diagram of a process, which may be used in an embodiment to implement variable rate broadcast with soft handoff.

FIG. 5 illustrates a flow diagram of a process 500, which may be used in an embodiment to implement variable rate broadcast with soft handoff. Step 510 selects a rate set, including a plurality of distinct data rates each associated with a transmission format. Step 520 instructs a plurality of APs to transmit a broadcast content in accordance with the rate set, the rate set configured to allow broadcast packets transmitted by the APs to be incrementally combined (e.g., on a per-slot basis at an AT). In some embodiments, the data rates and corresponding transmission formats in the rate set may be selected and assigned to the APs in relation to supportable data rates of the cells serviced by the APs, as well as the constraints imposed by the neighboring cells for supporting soft handoff, such as described above. The rate set may also be selected based in part on the size of the broadcast content to be transmitted.

Figure 6:
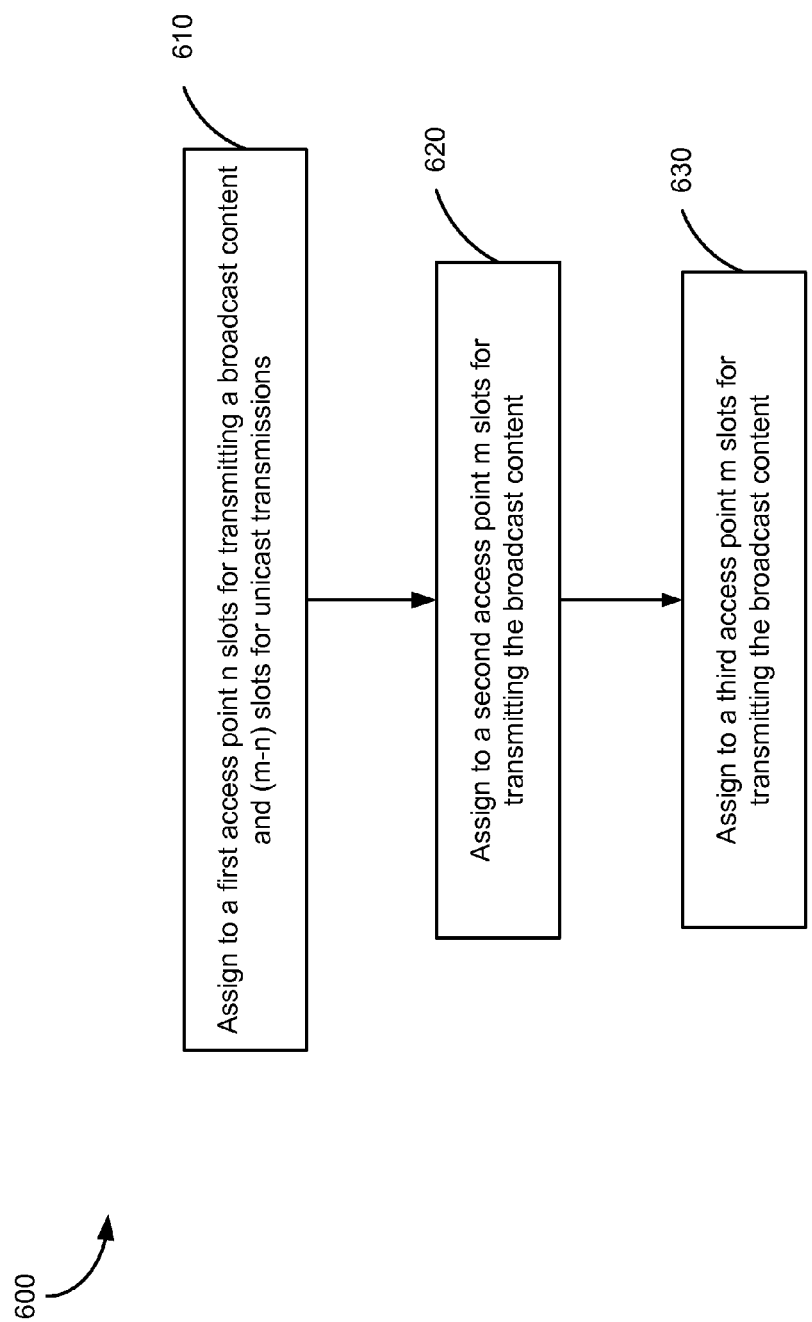
FIG. 6 illustrates a flow diagram of a process, which may be used in an embodiment to implement variable rate broadcast with soft handoff.

FIG. 6 depicts a flow diagram of a process 600, which may be used in an embodiment to implement variable rate broadcast with soft handoff. Step 610 assigns to a first AP n slots for transmitting a broadcast content and (m−n) slots for unicast transmissions (m and n being integers and m>n). Step 620 assigns to a second AP m slots for transmitting the broadcast content. Step 630 assigns to a third AP m slots for transmitting the broadcast content. In one embodiment, the first AP may service a first cell capable of supporting a data rate of R. The second AP may service a second cell adjacent to the first cell, which is also capable of supporting the data rate R. The third AP may service a third cell adjacent to the second cell, which capable of supporting a data rate of (n/m) R, such as described above.

Figure 7:
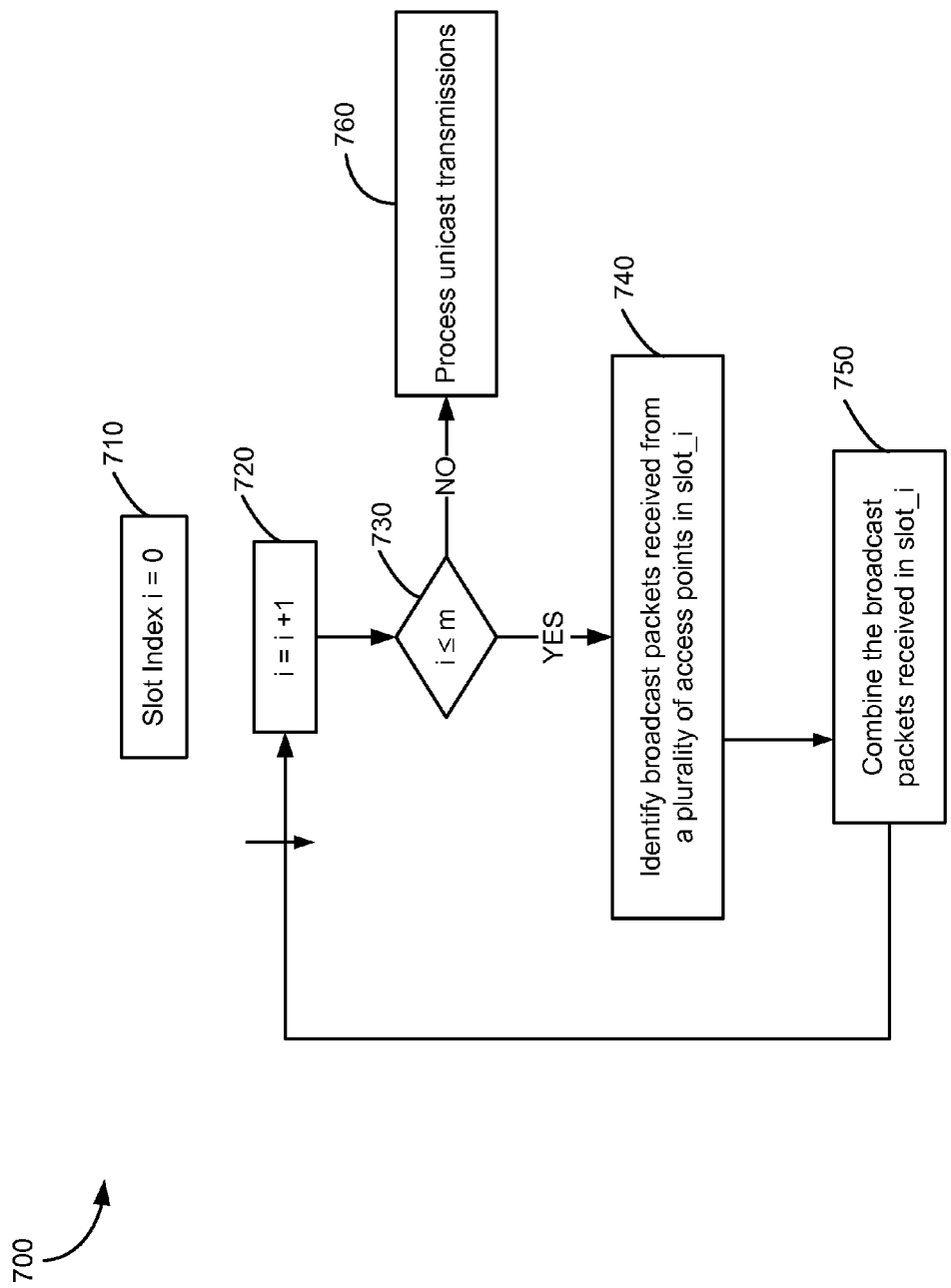
FIG. 7 illustrates a flow diagram of a process, which may be used in an embodiment to implement variable rate broadcast with soft handoff.

FIG. 7 depicts a flow diagram of a process 700, which may be used in an embodiment to implement variable rate broadcast with soft handoff. Step 710 sets a slot index i to be zero. Step 720 selects a transmission slot and increment the slot index by 1 (i=i+1). Step 730 determines if i≤m, where m is the number of transmission slots allocated for broadcast transmissions. If the outcome of step 730 is "YES", step 740 follows and identifies broadcast packets received from a plurality of APs in slot_i. Step 750 then soft-combines the received broadcast packets in slot_i. (Note, for broadcast transmissions in CDMA format, the received signals may first undergo despreading, before being soft-combined. For broadcast transmissions in OFDM format, the received signals may be directly soft-combined.) Process 700 subsequently returns to step 720 and proceed with the next transmission slot. If the outcome of step 730 is "NO", process 700 may for example proceed with processing unicast transmissions, such as shown in step 760.

Figure 8:
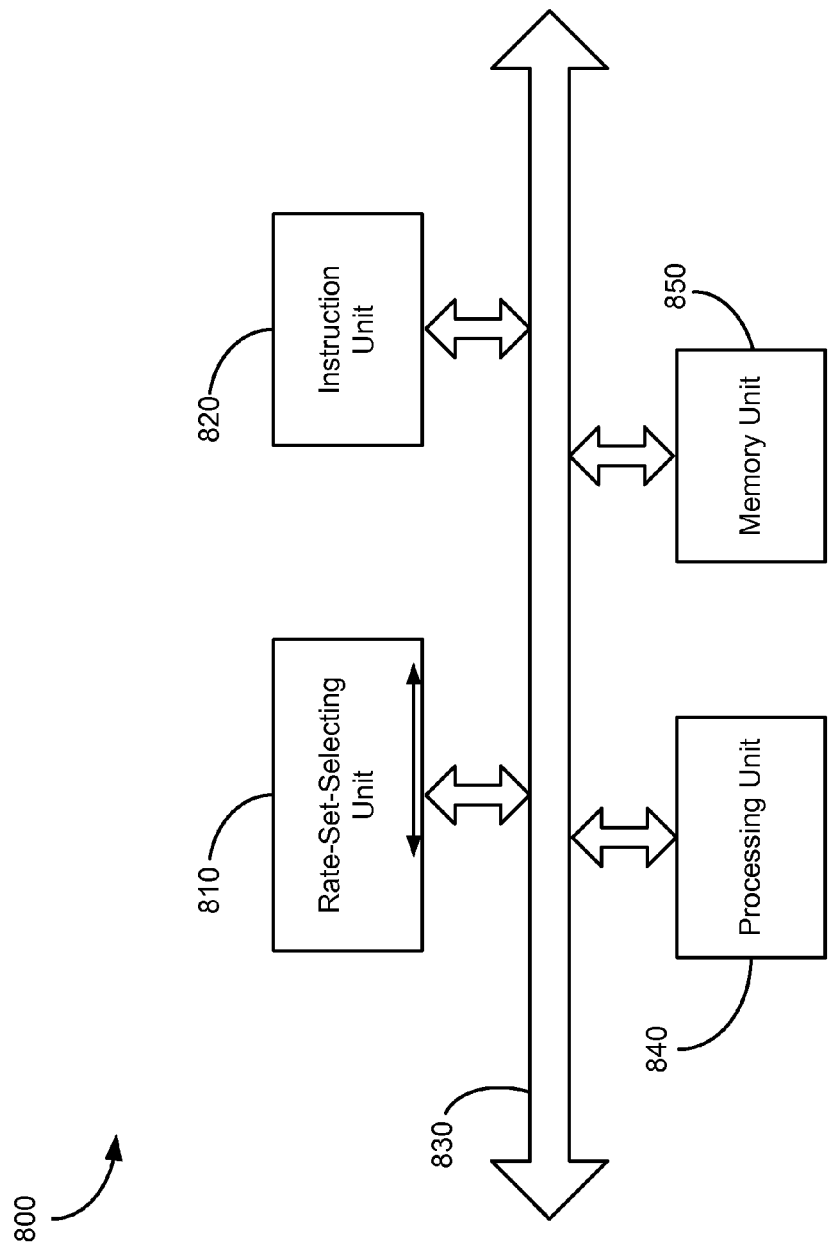
FIG. 8 shows a block diagram of an apparatus, in which some disclosed embodiments may be implemented.

FIG. 8 shows a block diagram of an apparatus 800, which may be used to implement some disclosed embodiments (such as described above). By way of example, apparatus 800 may include a rate-set-selecting unit (or module) 810 configured to select a rate set, including a plurality of distinct data rates each associated with a transmission format, and an instruction unit 820 configured to instruct a plurality of APs to transmit the broadcast content in accordance with the rate set. The rate set may be configured so as to allow the broadcast packets transmitted by the APs to be incrementally combined (such as described above).

In some embodiments, rate-set-selecting unit 810 may for example be configured to carry out process 400 illustrated in FIG. 4. Instruction unit 820 may for example be configured to carry out process 600 illustrated in FIG. 6.

In apparatus 800, rate-set-selecting unit 810 and instruction unit 820 may be coupled to a communication bus 830. A processing unit 840 and a memory unit 850 may also be coupled to communication bus 830. Processing unit 840 may be configured to control and/or coordinate the operations of various units. Memory unit 850 may embody instructions to be executed by processor 840.

In some embodiments, apparatus 800 may be implemented in an ANC (e.g., ANC 130 illustrated in FIG. 1), a central controller for the network, or other network infrastructure means.

Figure 9:
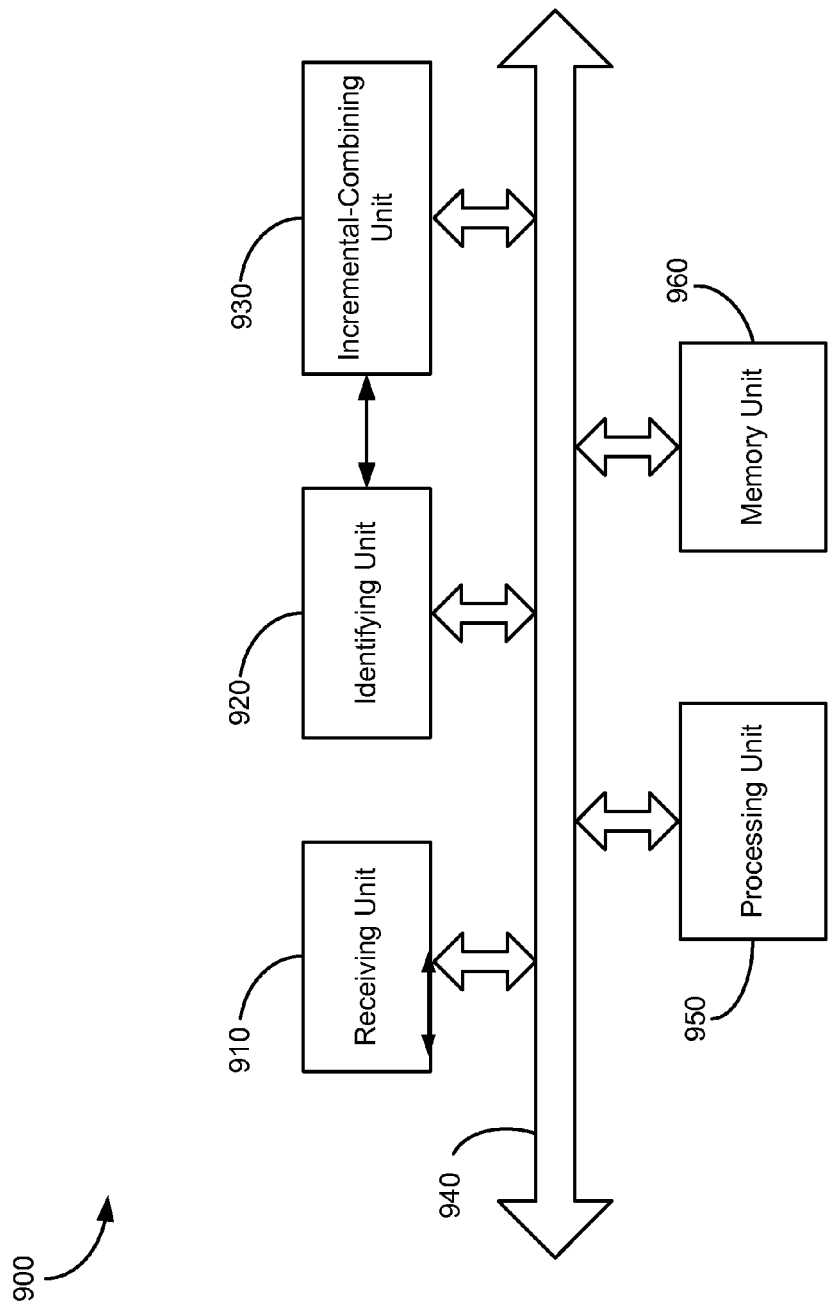
FIG. 9 shows a block diagram of an apparatus, in which some disclosed embodiments may be implemented.

FIG. 9 shows a block diagram of an apparatus 900, which may be used to implements some disclosed embodiments (such as described above). By way of example, apparatus 900 may include a receiving unit (or module) 910 configured to receive data packets transmitted from a plurality of APs, an identifying unit 920 configured to identify broadcast packets in the received data packets, and an incremental-combining unit 930 configured to combine the identified broadcast packets incrementally (e.g., on a per-slot basis). In some embodiments, receiving unit 910, identifying unit 920, and incremental-combining unit 930 may for example be configured to carry our process 700 illustrated in FIG. 7.

In apparatus 900, receiving unit 910, identifying unit 920, and incremental-combining unit 930 may be coupled to a communication bus 940. A processing unit 950 and a memory unit 960 may also be coupled to communication bus 940. Processing unit 950 may be configured to control and/or coordinate the operations of various units. Memory unit 960 may embody instructions to be executed by processing unit 950. In some embodiments, apparatus 900 may be implemented in an AT, or other data receiving means.

Embodiments disclosed herein (such as described above) provide some embodiments of variable rate broadcast services with soft handoff. There are other embodiments and implementations.

Various units/modules in FIGS. 8-9 and other embodiments may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Various disclosed embodiments may be implemented in a controller, an AT, and other means for providing broadcast/multicast services. Embodiments disclosed herein may be applicable to a data processing system, a wireless communication system, a unidirectional broadcast system, and any other system desiring efficient transmission of information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus adapted for wireless communications, comprising a processor configured to:
   assign to each cell a nominal rate in relation to each cell being in soft handoff with at least one neighboring cell;
   identify a minimum nominal rate assigned to each cell and the at least one neighboring cell; and
   assign to each cell a broadcast data rate equal to the identified minimum nominal rate;
   wherein the processor is further configured to assign each cell the nominal rate configured to allow for incremental combining.

2. The apparatus of claim 1, wherein the processor is further configured to assign each cell the nominal rate based on an amount of soft handoff support the at least one neighboring cell would provide.

3. The apparatus of claim 1, wherein the processor is further configured to:
   select a rate set including a plurality of distinct data rates each associated with one of a plurality of transmission formats configured to be incrementally combined; and
   instruct a plurality of access points to transmit a broadcast content in accordance with the rate set, wherein the plurality of access points includes each cell and the at least one neighbor cell.

4. The apparatus of claim 3, wherein the rate set includes a first data rate $R_1=R$, a second data rate $R_2=R/2$, and third data rate $R_3=R/3$, associated with 1-slot, 2-slot, and 3-slot transmission formats, respectively, to support incrementally combining on a per-slot basis.

5. The apparatus of claim 3, wherein the processor is further configured to select the plurality of transmission formats to include a single slot transmission format and at least one multiple slot transmission format, wherein a first slot of both the single slot transmission format and the at least one multiple slot transmission format is configured to carry a first identical broadcast transmission.

6. The apparatus of claim 3, wherein the processor is further configured to select the plurality of transmission formats to include a single slot transmission format and at least a first multiple slot transmission format and a second multiple slot transmission format, wherein the first slot of each of the single slot transmission format, the first multiple slot transmission format, and the second multiple slot transmission format is configured to carry a first identical broadcast transmission, and wherein a second slot of the first multiple slot transmission format and the second multiple slot transmission format is configured to carry a second identical broadcast transmission.

7. The apparatus of claim 3, wherein the plurality of cells includes a first cell and wherein the at least one neighbor cell comprises a first neighbor cell that supports a first data rate and a second neighbor cell that supports a second data rate less than the first data rate, and wherein the processor configured to assign to each cell the broadcast data rate equal to the identified minimum nominal rate is further configured to assign one of the plurality of transmission formats that corresponds to the second data rate to the first cell.

8. The apparatus of claim 3, wherein the processor is further configured to:
   assign to a first access point of the plurality of access points n slots for transmitting the broadcast content and (m−n) slots for unicast transmissions (m>n);
   assign to a second access point m slots for transmitting the broadcast content; and
   assign to a third access point m slots for transmitting the broadcast content.

9. The apparatus of claim 8, wherein the first access point, the second access point, and the third access point are configured to service a first cell, a second cell neighboring to the first cell, and a third cell neighboring to the second cell, respectively, and wherein the first cell is capable of supporting a data rate of R, and the third cell is capable of supporting a data rate of $(n/m)R$.

10. A method for wireless communications, comprising:
    assigning to each cell a nominal rate in relation to each cell being in soft handoff with at least one neighboring cell;
    identifying a minimum nominal rate assigned to each cell and the at least one neighboring cell; and
    assigning to each cell a broadcast data rate equal to the identified minimum nominal rate;
    wherein assigning to each cell the nominal rate comprises assigning each cell the nominal rate configured to allow for incremental combining.

11. The method of claim 10, wherein assigning to each cell the nominal rate comprises assigning based on an amount of soft handoff support the at least one neighboring cell would provide.

12. The method of claim 10, further comprising:
    selecting a rate set including a plurality of distinct data rates each associated with one of a plurality of transmission formats configured to be incrementally combined; and
    instructing a plurality of access points to transmit a broadcast content in accordance with the rate set, wherein the plurality of access points includes each cell and the at least one neighbor cell.

13. The method of claim 12, wherein selecting the rate set further comprises selecting the rate set including a first data rate $R_1=R$, a second data rate $R_2=R/2$, and third data rate $R_3=R/3$, associated with 1-slot, 2-slot, and 3-slot transmission formats, respectively, to support incrementally combining on a per-slot basis.

14. The method of claim 12, wherein selecting the rate set further comprises selecting the plurality of transmission formats including a single slot transmission format and at least one multiple slot transmission format, wherein a first slot of both the single slot transmission format and the at least one multiple slot transmission format is configured to carry a first identical broadcast transmission.

15. The method of claim 12, wherein selecting the rate set further comprises selecting the plurality of transmission formats including a single slot transmission format and at least a first multiple slot transmission format and a second multiple slot transmission format, wherein the first slot of each of the single slot transmission format, the first multiple slot transmission format, and the second multiple slot transmission format is configured to carry a first identical broadcast transmission, and wherein a second slot of the first multiple slot transmission format and the second multiple slot transmission format is configured to carry a second identical broadcast transmission.

16. The method of claim 12, wherein the plurality of cells includes a first cell and wherein the at least one neighbor cell comprises a first neighbor cell that supports a first data rate and a second neighbor cell that supports a second data rate less than the first data rate, and wherein assigning to each cell the broadcast data rate equal to the identified minimum nominal rate further comprises assigning one of the plurality of transmission formats that corresponds to the second data rate to the first cell.

17. The method of claim 12, further comprising:
assigning to a first access point of the plurality of access points n slots for transmitting the broadcast content and (m−n) slots for unicast transmissions (m>n);
assigning to a second access point m slots for transmitting the broadcast content; and
assigning to a third access point m slots for transmitting the broadcast content.

18. The method of claim 17, wherein the first access point, the second access point, and the third access point are configured to service a first cell, a second cell neighboring to the first cell, and a third cell neighboring to the second cell, respectively, and wherein the first cell is capable of supporting a data rate of R, and the third cell is capable of supporting a data rate of (n/m)R.

19. An apparatus, comprising:
means for assigning to each cell a nominal rate in relation to each cell being in soft handoff with at least one neighboring cell;
means for identifying a minimum nominal rate assigned to each cell and the at least one neighboring cell; and
means for assigning to each cell a broadcast data rate equal to the identified minimum nominal rate;
wherein the means for assigning to each cell the nominal rate comprises a means for assigning each cell the nominal rate configured to allow for incremental combining.

20. The apparatus of claim 19, wherein the means for assigning to each cell the nominal rate further comprises a means for assigning based on an amount of soft handoff support the at least one neighboring cell would provide.

21. The apparatus of claim 19, further comprising:
means for selecting a rate set including a plurality of distinct data rates each associated with one of a plurality of transmission formats configured to be incrementally combined; and
means for instructing a plurality of access points to transmit a broadcast content in accordance with the rate set, wherein the plurality of access points includes each cell and the at least one neighbor cell.

22. The apparatus of claim 21, wherein the rate set includes a first data rate $R_1=R$, a second data rate $R_2=R/2$, and third data rate $R_3=R/3$, associated with 1-slot, 2-slot, and 3-slot transmission formats, respectively, to support incrementally combining on a per-slot basis.

23. The apparatus of claim 21, wherein the means for selecting the rate set further comprises means for selecting the plurality of transmission formats including a single slot transmission format and at least one multiple slot transmission format, wherein a first slot of both the single slot transmission format and the at least one multiple slot transmission format is configured to carry a first identical broadcast transmission.

24. The apparatus of claim 21, wherein the means for selecting the rate set further comprises means for selecting the plurality of transmission formats including a single slot transmission format and at least a first multiple slot transmission format and a second multiple slot transmission format, wherein the first slot of each of the single slot transmission format, the first multiple slot transmission format, and the second multiple slot transmission format is configured to carry a first identical broadcast transmission, and wherein a second slot of the first multiple slot transmission format and the second multiple slot transmission format is configured to carry a second identical broadcast transmission.

25. The apparatus of claim 21, wherein the plurality of cells includes a first cell and wherein the at least one neighbor cell comprises a first neighbor cell that supports a first data rate and a second neighbor cell that supports a second data rate less than the first data rate, and wherein the means for assigning to each cell the broadcast data rate equal to the identified minimum nominal rate further comprises means for assigning one of the plurality of transmission formats that corresponds to the second data rate to the first cell.

26. The apparatus of claim 21, further comprising:
means for assigning to a first access point of the plurality of access points n slots for transmitting the broadcast content and (m−n) slots for unicast transmissions (m>n);
means for assigning to a second access point m slots for transmitting the broadcast content; and
means for assigning to a third access point m slots for transmitting the broadcast content.

27. The apparatus of claim 26, wherein the first access point, the second access point, and the third access point are configured to service a first cell, a second cell neighboring to the first cell, and a third cell neighboring to the second cell, respectively, and wherein the first cell is capable of supporting a data rate of R, and the third cell is capable of supporting a data rate of (n/m)R.

28. A non-transitory computer-readable storage medium comprising code, which, when executed by a machine, cause the machine to perform operations for wireless communications, the computer-readable storage medium comprising:
code for assigning to each cell a nominal rate in relation to each cell being in soft handoff with at least one neighboring cell;
code for identifying a minimum nominal rate assigned to each cell and the at least one neighboring cell; and
code for assigning to each cell a broadcast data rate equal to the identified minimum nominal rate;
wherein the code for assigning to each cell the nominal rate comprises code for assigning each cell the nominal rate configured to allow for incremental combining.

29. The non-transitory computer-readable storage medium of claim 28, wherein the code for assigning to each cell the nominal rate comprises code for assigning based on an amount of soft handoff support the at least one neighboring cell would provide.

30. The non-transitory computer-readable storage medium of claim 28, further comprising:
code for selecting a rate set including a plurality of distinct data rates each associated with one of a plurality of transmission formats configured to be incrementally combined; and
code for instructing a plurality of access points to transmit a broadcast content in accordance with the rate set, wherein the plurality of access points includes each cell and the at least one neighbor cell.

31. The non-transitory computer-readable storage medium of claim 30, wherein the rate set includes a first data rate $R=R$, a second data rate $R_2=R/2$, and third data rate $R_3=R/3$, associated with 1-slot, 2-slot, and 3-slot transmission formats, respectively, to support incrementally combining on a per-slot basis.

32. The non-transitory computer-readable storage medium of claim 30, wherein the code for selecting the rate set further comprises code for selecting the plurality of transmission formats including a single slot transmission format and at least one multiple slot transmission format, wherein a first slot of both the single slot transmission format and the at least one multiple slot transmission format is configured to carry a first identical broadcast transmission.

33. The non-transitory computer-readable storage medium of claim 30, wherein the code for selecting the rate set further comprises code for selecting the plurality of transmission formats including a single slot transmission format and at least a first multiple slot transmission format and a second multiple slot transmission format, wherein the first slot of each of the single slot transmission format, the first multiple slot transmission format, and the second multiple slot transmission format is configured to carry a first identical broadcast transmission, and wherein a second slot of the first multiple slot transmission format and the second multiple slot transmission format is configured to carry a second identical broadcast transmission.

34. The non-transitory computer-readable storage medium of claim 30, wherein the plurality of cells includes a first cell and wherein the at least one neighbor cell comprises a first neighbor cell that supports a first data rate and a second neighbor cell that supports a second data rate less than the first data rate, and wherein the code for assigning to each cell the broadcast data rate equal to the identified minimum nominal rate further comprises code for assigning one of the plurality of transmission formats that corresponds to the second data rate to the first cell.

35. The non-transitory computer-readable storage medium of claim 30, further comprising:
   code for assigning to a first access point of the plurality of access points n slots for transmitting the broadcast content and (m−n) slots for unicast transmissions (m>n);
   code for assigning to a second access point m slots for transmitting the broadcast content; and
   code for assigning to a third access point m slots for transmitting the broadcast content.

36. The non-transitory computer-readable storage medium of claim 35, wherein the first access point, the second access point, and the third access point are configured to service a first cell, a second cell neighboring to the first cell, and a third cell neighboring to the second cell, respectively, and wherein the first cell is capable of supporting a data rate of R, and the third cell is capable of supporting a data rate of (n/m)R.

* * * * *